United States Patent [19]
Abraham et al.

[11] 3,760,207

[45] Sept. 18, 1973

[54] STEPPING MOTOR STRUCTURE

[75] Inventors: Dennis G. Abraham, Vestal; George J. Dohanich, Endicott; Frederick W. Doolittle, Binghamton; Stephen H. Mills, Newark Valley, all of N.Y.

[73] Assignee: International Business Machines Corporation, Armonk, N.Y.

[22] Filed: May 15, 1972

[21] Appl. No.: 253,064

[52] U.S. Cl. .................... 310/49, 310/67, 310/154
[51] Int. Cl. .......................................... H02k 37/00
[58] Field of Search .................... 310/49, 67, 112, 310/162, 154, 163, 156, 164, 254, 256, 266

[56] References Cited
UNITED STATES PATENTS

| | | | |
|---|---|---|---|
| 3,493,800 | 2/1970 | Barrett | 310/67 |
| 754,802 | 3/1904 | Porsche | 310/67 |
| 3,179,825 | 4/1965 | Terry | 310/67 |
| 3,500,081 | 3/1970 | Drejza | 310/49 |
| 3,561,834 | 2/1971 | Durand | 310/67 |
| 765,078 | 7/1904 | Jigouzo | 310/67 |
| 2,952,788 | 9/1960 | Volkerling | 310/154 |

Primary Examiner—R. Skudy
Attorney—Paul M. Brannen et al.

[57] ABSTRACT

A dynamoelectric machine having a stator enclosed in a rotor, the stator including spider-like projections each having teeth which coact with teeth on the interior of the rotor. The operating windings are located on the legs of the stator spider. A cylindrical permanent magnet provides an operating magnetic bias, and a flux guiding element steers the flux appropriately. A single-ended and a balanced embodiment are disclosed.

7 Claims, 4 Drawing Figures

PATENTED SEP 18 1973 3,760,207

STEPPING MOTOR STRUCTURE

BACKGROUND OF THE INVENTION

Dynamo-electric machines of the "inside-out" type, in which the inner portion is the stator element, and an outer shell acts as a rotor, are known in the art, as for example U. S. Pat. No. 3,179,825. This invention provides a greatly simplified construction of such a machine, particularly suited for stepper motor operation, utilizing only a small number of parts.

SUMMARY OF THE INVENTION

Briefly described, the present invention comprises a cylindrical rotor mounted for rotation on a shaft which supports a stator structure, having a plurality of radially aligned teeth which cooperate with other teeth on the interior of the rotor. The stator comprises a plurality of outwardly extending portions or spokes, each provided with an appropriate coil or winding. The windings, sequentially energized, provide the operating flux for the motor. A circular permanent magnet, mounted on the shaft, provides a biasing flux. A flux focusing or guiding member is also mounted on the shaft to steer the flux in the optimum paths. A plurality of conventional tractor pins may be provided around the outer periphery of the rotor, to engage feed holes in a paper web, whereby the motor affords an improved continuous-web document feeding means.

Accordingly, it is a principal object of this invention to provide an improved stepping motor structure, in which the rotor surrounds and rotates about the stator.

Another object of the invention is to provide an improved stepping motor of the type described, in which a circular permanent magnet is provided for biasing purposes and is located within the rotor.

Still another object of the invention is to provide an improved motor of the type described, in which a circular flux focusing member is mounted on the shaft within the rotor, to steer the flux in the motor.

The foregoing and other objects, features and advantages of the invention will be apparent from the following more particular description of preferred embodiments of the invention, as illustrated in the accompanying drawings.

BRIEF DESCRIPTION OF THE DRAWINGS

Similar reference characters refer to similar parts in each of the several views.

Referring to the first embodiment of the invention, illustrated in FIGS. 1 and 2, FIG. 1 shows a cross-sectional view of the stepping motor according to the first embodiment of the invention, taken along the axis of the motor. As shown in the drawings, the stationary shaft 3 has mounted thereon a stator spider or core assembly having a plurality of radially extending portions or spokes 5, each of which is enlarged at the outer end thereof and provided with the plurality of teeth or pole tips such as those indicated by reference character 7. Around each of the radial spokes or portions 5, there is wound a coil 9. The coil or winding is energized, by circuitry not shown, so that the flux which is generated within the spider, will pass either radially outward or inward, depending on the polarity of the energizing current. At the opposite end of the motor, a circular or ring permanent magnet 11 is provided, magnetized axially, which is mounted on a suitable flux focusing element 13, which acts as a flux guide or conductor. The cup-shaped outer shell or rotor 15 is mounted on shaft 3 by means of a suitable bearing 17 and carries around its periphery a plurality of pins 19 which may be utilized for engaging holes in the edge of a paper web when the motor is used as a document transport device. The inner surface of the rotor 15 is grooved or fluted so as to produce a plurality of inwardly extending teeth, a few of which are designated by reference character 21. The faces of these teeth have the same dimensions as those on the stator. In one particular arrangement of the type shown in FIGS. 1 and 2, each of eight spokes or poles 5 has four teeth at the outer end thereof, with bifilar coils wound on the pole pieces. The stator is provided with 48 teeth spaced at 7.5° intervals. The diameter is selected so that the periphery advances 1/6 inch for each 7.5° increment. Operating as a normal stepping motor, it has a step angle of 1.875°, thus requiring four steps to advance 7.5°. This simplifies the logic design and system synchronization. The pole pieces are each advanced ¼ of a tooth pitch to provide operation as set forth in U. S. Pat. No. 2,589,999.

Figure 1:
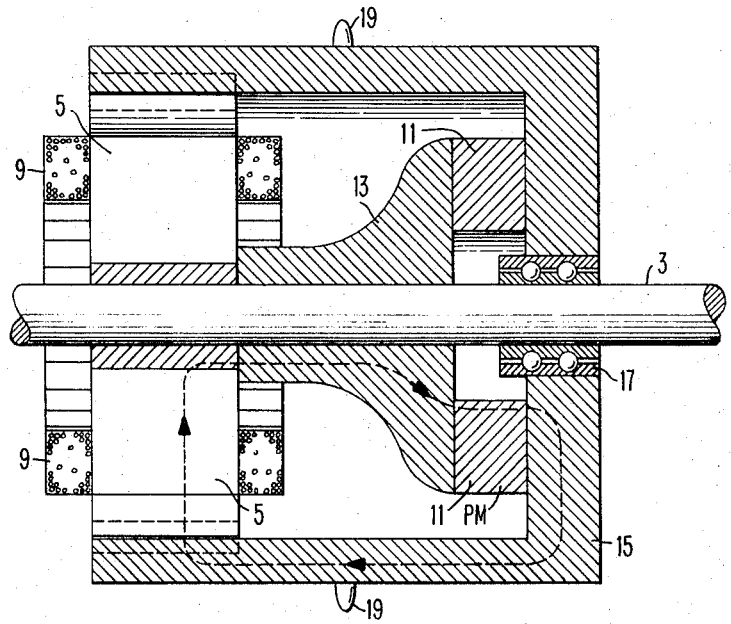
FIG. 1 is a longitudinal sectional view of a motor constructed in accordance with a first embodiment of the invention.
Figure 2:
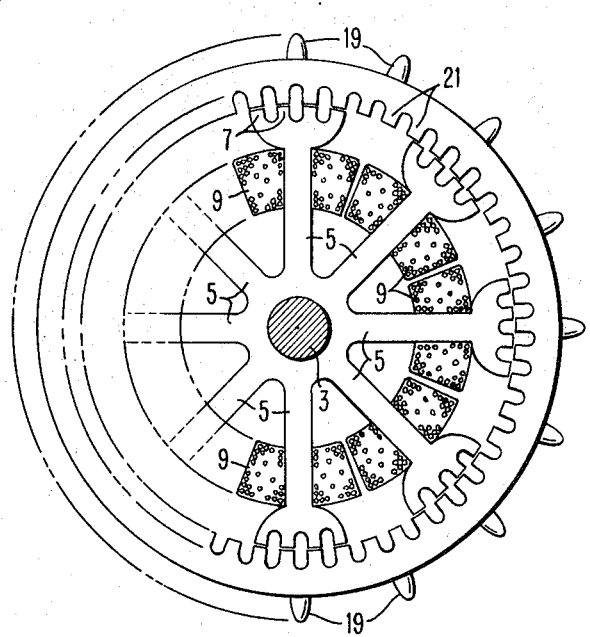
FIG. 2 is a sectional view taken along the axis of rotation of FIG. 1.
Figure 3:
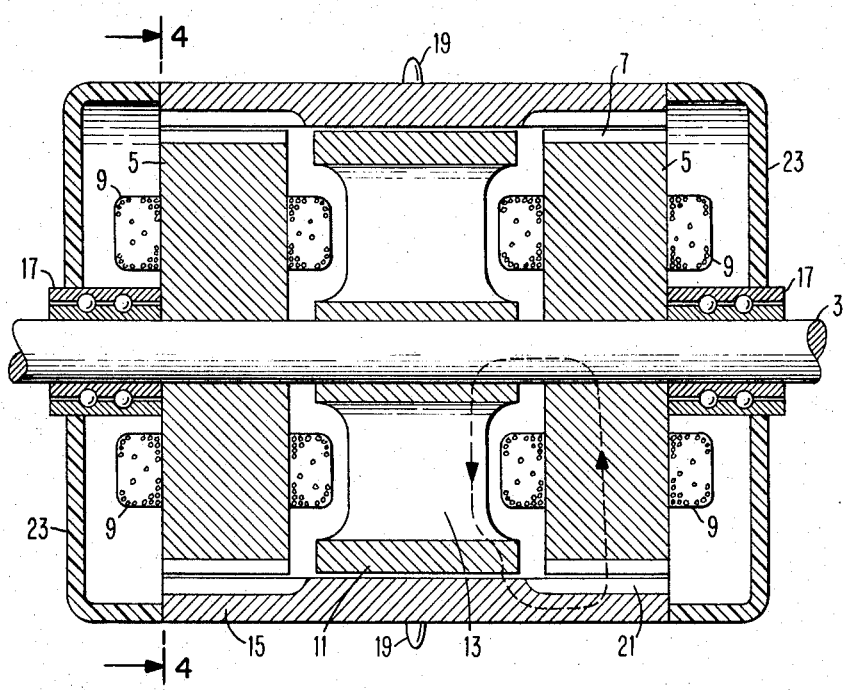
FIG. 3 is a longitudinal sectional view of a motor constructed in accordance with a second embodiment of the invention.
Figure 4:
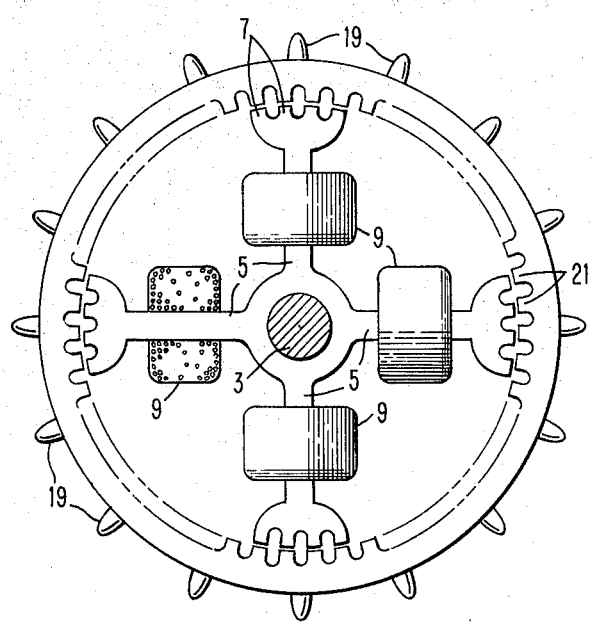
FIG. 4 is a sectional view taken along the axis of rotation of FIG. 3.

Referring now to the second embodiment of the invention, as shown in FIGS. 3 and 4, it is principally distinguished by a balanced construction. Two sets of identical stator elements 5 are provided, one at each end of the rotor cylinder 15. The rotor is supported for rotation by the non-magnetic end caps 23, on the bearings 17. The permanent magnet is in the form of a cylinder 11, with the flux focusing member 13 extending between the shaft 3 and the radially oriented magnet 11. In this case, the stator elements 5 are skewed ¼ tooth pitch with respect to each other.

By separating the stator into two elements, a larger window area is provided for the windings allowing more tooth area, heavier saturation or cooler operating temperatures, or some combination of these advantages. The magnetic flux path is divided and shortened, thus reducing losses due to eddy currents, etc. The permanent magnet is located close to the teeth of the motor, improving the coupling and reducing the size of the magnet.

From the foregoing, it will be apparent that a stepping motor constructed in accordance with the present invention provides an efficient economical stepping motor, whose inside-out construction makes it adaptable to functions such as continuous form feeding.

While the invention has been particularly shown and described with reference to preferred embodiments thereof, it will be understood by those skilled in the art that the foregoing and other changes in form and details may be made therein without departing from the spirit and scope of the invention.

We claim:

1. A stepping motor comprising:
   a stator fixedly mounted on a shaft, said stator comprising a spider having a plurality of spokes radially extending outward from the shaft, operating windings disposed on said spokes and effective when energized to generate magnetic flux in said spokes, the direction of flux being radial, an enlarged pole piece section at the outer end of each of said spokes, said sections each being provided with a plurality of radial teeth, a rotor surrounding and substantially enveloping said stator, said rotor comprising a cylinder having a plurality of teeth on the inner surface thereof corresponding in dimension to the teeth of said stator, the teeth on said stator and the teeth on said rotor being skewed or advanced with respect to one another by one quarter of a pole pitch, said rotor being mounted for rotation on said shaft, a permanent magnet flux source for providing an operating flux bias for said motor, said magnet comprising a circular magnet member concentric with said shaft and said rotor, and flux focusing means associated with said magnet for directing the flux from said magnet in a preferred path including said rotor and said stator.

2. A stepping motor as claimed in claim 1, in which said permanent magnet comprises a ring-shaped magnet concentric with said shaft, and located at the closed end of said rotor, and said flux focusing means comprises a tapered cylindrical member extending axially from said magnet to said spider.

3. A stepping motor comprising a stator fixedly mounted on a shaft, said stator having a first and a second spider, each comprising a plurality of spokes radially extending outward from the shaft, said spiders being disposed at opposite ends of the motor, operating windings disposed on said spokes and effective when energized to generate magnetic flux in said spokes, the direction of flux being radial, an enlarged pole piece section at the outer end of each of said spokes, said sections each being provided with a plurality of radial teeth, a rotor surrounding and substantially enveloping said stator, said rotor comprising a cylinder having a plurality of teeth on the inner surface thereof corresponding in dimension to the teeth of said stator, said rotor being mounted on bearings at opposite ends of said motor for rotation on said shaft, a permanent magnet flux source for providing an operating flux bias for said motor, said magnet comprising a circular magnet member concentric with said shaft and said rotor, and flux focusing means associated with said magnet for directing the flux from said magnet in a preferred path including said rotor and said stator, said flux focusing means comprising a circular magnetic element fitting between said magnet and said shaft, said permanent magnet and said focusing means being disposed centrally on said shaft with respect to said first and second spiders.

4. A stepping motor as claimed in claim 3, in which said permanent magnet is radially magnetized.

5. A stepping motor as claimed in claim 3, in which the teeth on said stator teeth and said rotor teeth are skewed or advanced with respect to one another by an even fraction of a pole pitch.

6. A stepping motor as claimed in claim 5, in which the fraction is one-quarter of a pole pitch.

7. A stepping motor as claimed in claim 3, in which the outer surface of said rotor is provided with load engaging means.

* * * * *